Nov. 10, 1970     R. A. PUSTELL     3,539,400

HIGH TEMPERATURE COMPOSITE SUPPORT FOR A THERMOCOUPLE PROBE

Filed Dec. 27, 1965

INVENTOR

ROBERT A. PUSTELL

BY *Richard E. Hosley*

ATTORNEY

United States Patent Office
3,539,400
Patented Nov. 10, 1970

3,539,400
HIGH TEMPERATURE COMPOSITE SUPPORT FOR
A THERMOCOUPLE PROBE
Robert A. Pustell, Melrose, Mass., assignor to General
Electric Company, a corporation of New York
Filed Dec. 27, 1965, Ser. No. 516,417
Int. Cl. H01v 1/04
U.S. Cl. 136—233                                 5 Claims

ABSTRACT OF THE DISCLOSURE

A thermocouple proble is encased in a plurality of tightly compacted insulative, high strength and corrosion resistant layers, free of voids, to provide a structure wherein deflection is substantially reduced under conditions of high temperature, corrosion and vibration.

This invention generally relates to a support device and more particularly to a support to be used under adverse conditions of high vibration and extremely high temperature.

A particularly well-known group of measuring devices used under these conditions includes thermocouple probes which are designed to measure the temperature of a medium by immersion therein at a remote location and to convert the temperature into a useful output signal, normally electrical. In recent years a need for accurate measurement of higher temperatures has emerged, and substantial research has been directed to obtain a thermocouple which accurately measures these temperatures under these conditions with an extremely long life.

One particularly pertinent reason for this research is the need for accurate temperature measurements of jet engines. Jet engine manufacturers have raised the engine-operating temperatures to a point near the maximum permissible temperature for the engine metals. However, these maximum temperatures have been limited by the accuracy of the temperature measuring devices in order to assure safe engine operation.

Generally, thermocouple probes, used to provide this temperature indication, have been disposed in a cantilever fashion in an annular gas passage surrounding the engine. Normally they are attached to the outer engine skin which surrounds the gas passage. These probes are immersed in the gas stream at various levels to monitor the temperatures at these levels. It is critical that the probe position does not vary because the temperature gradient across the gas passage is usually extremely steep. As can be seen, if there were a substantial deflection from the calculated position, harmful errors could result.

In addition to these high temperatures, which can exceed 2000° F., jet engine application subjects thermocouple probes to these adverse high temperature operating conditions under extreme vibration, static or dynamic loading or thermal shock which can cause the thermocouple probe to deflect from its original position. In addition to the error which can be introduced, thermocouple probe movement under these conditions is also indicative of incipient failure and ultimately results in such failure.

Therefore, it is an object of this invention to provide a support for a measuring device which accurately positions the measuring device under conditions of high temperature and vibration.

Another object of this invention is to provide a support for a measuring device which has a longer life under conditions of high temperature, vibration and static or dynamic loading than prior art probes.

Many application environments are very corrosive to materials. For example, oxidation in air increases as the air temperature is elevated; and at temperatures in the order of 2000° F., the oxidizing effect is usually detrimental. Thus, if a thermocouple probe is disposed in this type of environment, its outer surface is easily oxidized and the probe may be seriously weakened. Sulfur attack on nickel base alloys is another example of environmental corrosive attack encountered in jet engine applications. Unfortunately, materials which are resistant to corrosion in this type of environment generally have little strength at temperature; and similarly, materials having the strength to withstand the mechanical and thermal shocks encountered in such operation are generally not resistant to corrosion.

Therefore, it is another object of this invention to provide a support which is resistant to thermal and mechanical stresses and environmental corrosion.

It is another object of this invention to provide a support which resists extreme environmental conditions of temperature, vibration and oxidation.

Briefly stated, in this invention a high-strength material and a corrosion-resistant material are formed into a support in concentric layers. In combination the layer of high strength material and the outer layer of corrosion-resistant material constitute a support wherein deflection is substantially reduced under conditions of high temperature and vibration.

This invention is set forth with particularity in the appended claims. The organization, advantages and further objects of the invention may be better understood by reference to the following description of various embodiments of a thermocouple probe taken in conjunction with the accompanying drawings and description.

FIG. 1 presents a view of a preferred embodiment of a measuring probe which is constructed in accordance with this invention.

Figure 1:
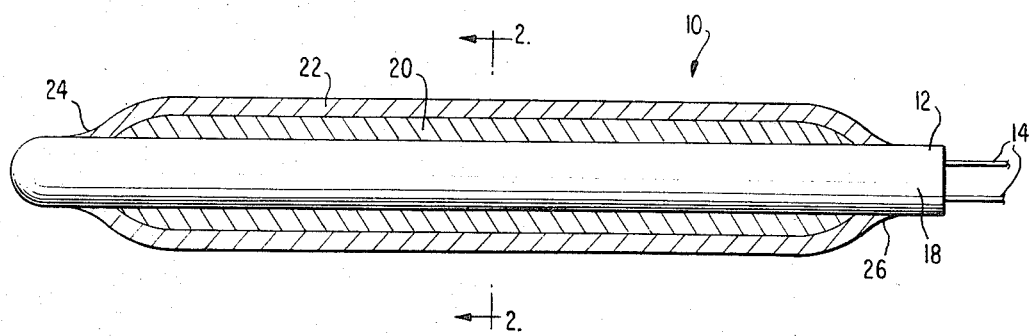
Figure 2:
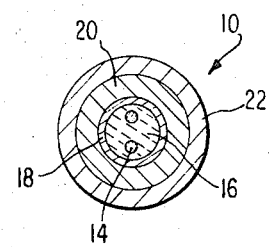
FIG. 2 is a sectional view taken along lines 2—2 of FIG. 1.

Referring first to FIGS. 1 and 2, a measuring probe and supporting structure 10 is shown as including a thermocouple probe of the type known in the art. The particular thermocouple probe 12 shown herein comprises a pair of element sensing wires 14 which are separated from one another by an insulating material 16 able to withstand high temperatures and vibration and an outer sheath 18. Generally, the insulating material is composed of magnesium oxide, beryllium oxide, or some other similar material which is swaged about element sensing wires 14 to support them and to insulate them from each other and from sheath 18. Sheath 18 is generally formed of an environmental resistant material which withstands corrosion. These materials are well known in the art, with the following materials being exemplary:

49% Ni-22% CR-9% Mo-18.5% Fe plus traces of other materials
76% Ni-15.5% Cr-3% Al plus traces of other materials
Fe-Cr-Al-Y alloys
Ni-Cr-ThO$_2$ dispersion alloys
Noble metals and alloys of noble metals When such a standard thermocouple probe has been subjected to high temperatures under conditions of vibration, inaccurate readings have resulted because under these conditions the thermocouple probe deflects, especially when mounted in a cantilever configuration. This deflection is substantially reduced by sheathing the thermocouple probe 12 with a composite sheath along the substantial length thereof. FIGS. 1 and 2 show a strong inner material sheath 20 which is compacted about sheath 18. Any material characterized by sufficient strength at elevated temperatures to substantially eliminate the deflection and by a low creep rate is acceptable. Some alloys which include these properties are tantalum with 10% tungsten by weight, tungsten with 25% rhenium by weight, or nickel with dispersed ThO$_2$. This strong inner material sheath 20 is then surrounded by an environmental resistant material sheath 22. Under thermal and mechanical stress this material should have properties similar to or compatible with those of the material of sheath 18; and normally both sheath 18 and environmental resistant material sheath 22 are formed of the same material.

The thermocouple assembly 10 shown in FIG. 1 is constructed by locating strong inner material sheath 20 in tubular form and environmental resistant material sheath 22 also in tubular form on a thermocouple probe. Sheaths 20 and 22 are then compacted tightly as by swaging or drawing to eliminate all voids between the sheaths 18, 20, and 22. In many cases compaction alone sufficiently seals the sheaths. However, in some applications it may be necessary to join environmental resistant material sheath 22 to sheath 18 by brazing or welding at point 24 and point 26.

The strong inner material sheath 20 is not normally affixed to either sheath 18 or environmental resistant material sheath 22 by welding or brazing. Rather, strong inner material sheath 20 is permitted to float or slip between the environmental resistant material sheath 22 and thermocouple probe sheath 18 when the thermocouple assembly is subjected to vibration, thermal shock or differential expansion. This multiple sheath design provides a substantial measure of vibrational damping to substantially increase the life of the unit, especially in high vibration applications. Sometimes it may be desired to anchor one end of the strong inner material sheath 20 to the thermocouple probe sheath 18 and the environmental resistant material sheath 22. This limits differential expansion to a single direction when the support is subjected to temperature changes.

Figure 3:
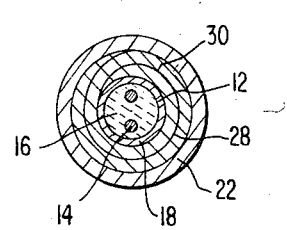
FIG. 3 is a sectional view of an alternate embodiment of a measuring probe constructed in accordance with this invention.

If severe thermal expansion mismatches are encountered in the various sheaths, if the vibration damping must attain a certain level, if it is desired to use materials that are not available in tubing form, or if it is desired to use a plurality of element combinations with varying characteristics, multiple layer construction can be used. One variation thereof is shown in FIG. 3. In this case, a sheet 28 of strong material is wrapped about the sheath 18 of thermocouple probe 12, which additionally comprises conductors 14 and insulating material 16, to form an inner sheath 20. Slippage between individual layers of sheet 28 enhances vibrational damping. In addition, the composite sheath can be graduated or tapered as stress levels vary along the probe length.

Figure 4:
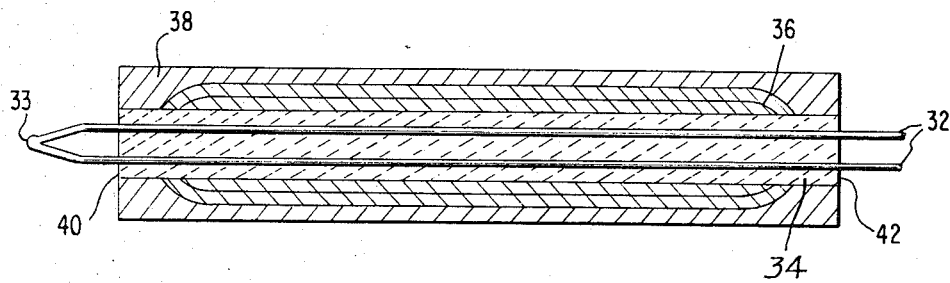
FIG. 4 illustrates another embodiment of a measuring probe constructed in accordance with this invention.

In some applications the material forming the strong inner sheath may be able to withstand limited exposure to constructed for such use, and it comprises a set of element sensing wires 32 terminated in a thermocouple junction 33 and embedded in a refractory material 34 such as magnesium oxide or beryllium oxide. No thermocouple sheath, such as designated by reference numeral 18 in FIG. 1, is used in this embodiment so a strong material inner sheath 36 is disposed about the refractory material core 34 and an environmental resistant material 38 then encloses the strong material inner sheath 36. As refractory material core 34 is somewhat porous, there is limited conduction of the oxidizing air from end 40 or 42 to the interface formed by core 34 and sheath 36. If this limited oxidation is permissible within the strength or life requirements of the probe, then the embodiment shown in FIG. 4 could be more desirable in terms of the material saved which would otherwise be used to form a sheath about core 34.

It is realized that when some materials are combined, there may be a tendency for one material to metallurgically diffuse into the other and thereby damage either one or both of the materials. Similarly, if differential thermal expansion is severe, galling, seizing, or buckling at the material interface could result from "sliding" therebetween. Whenever one or more of these conditions do exist, a diffusion barrier, a lubricating layer, or a compacted ceramic layer can be disposed between the multiple layers of the sheath. Materials for such barriers and layers are well known, and selection of a particular material would depend upon the particular effect required from the barrier or layer. In addition, multiple layers of the same or varying composition may be used to make up either the strong inner material layer or the oxidation or corrosion resistant outer layer and thereby further improve the thermal shock resistance of the support.

Briefly summarizing, this invention is directed to a support which exhibits combined resistance to deflection under conditions of high temperature and vibration and to environmental attack which is superior in its total characteristics than is any one of the component materials. This result is obtained by forming the support of two concentric sheaths with an inner sheath being formed of a high strength material while the outer sheath is formed of an environmental resistant material. By substantially eliminating all voids between sheaths, the advantageous properties of each of the materials complement one another while disadvantageous properties are overcome.

While the present invention has been described with reference to several particular embodiments thereof and a particular probe designed for a particular application, various modifications may be made by those skilled in the art without actually departing from the spirit and scope of the invention. Therefore, the appended claims are entitled to cover all such equivalent variations which come within the true spirit and scope of the invention.

What I claim as new and desire to secure by Letters Patent of the United States is:

1. An elongated electrical probe, adapted for use in a high temperature, oxidizing, high vibration environment, comprising:

a plurality of transversely spaced-apart, longitudinally extending, conductors;

a first elongated volume of insulating material tightly compacted between and around said conductors;

an annular first sheath of high temperature-high creep and deformation resistant material tightly compacted about said first volume;

a second sheath of high temperature-high corrosion resistant material tightly compacted about said first sheath;

means affixing said second sheath to said volume of insulating material, said first sheath being retained between said elongated volume and said second sheath without affixing said first sheath to either said volume or said second sheath whereby said first sheath is free to slip with respect thereto to absorb effects of vibration, thermal shock and the like.

2. A probe as recited in claim 1 wherein said first sheath comprises a plurality of layers of said high temperature-high creep and deformation resistant material.

3. A probe as recited in claim 2 wherein a particulate material having lubricating properties is disposed between said layers to improve slippage therebetween.

4. A probe according to claim 1 wherein said first sheath is formed as a roll having a plurality of layers of the same high temperature corrosion resistant material.

5. A probe according to claim 1 further including:
an additional sheath of high temperature-high corrosion resistant material compacted about said first volume sheath beneath said first sheath.

References Cited

UNITED STATES PATENTS

| | | |
|---|---|---|
| 2,798,893 | 7/1957 | Winkler. |
| 2,844,637 | 7/1958 | Borel et al. _____ 136—232 |
| 2,948,766 | 8/1960 | Schneider et al. _____ 136—232 |
| 2,962,898 | 12/1960 | Burling et al. _____ 136—232 |
| 3,106,493 | 8/1963 | Japka _____ 136—242 |
| 3,275,479 | 9/1966 | Binkowski _____ 136—233 |
| 3,290,178 | 12/1966 | Loveland _____ 136—230 |
| 3,314,293 | 4/1967 | Schraeder _____ 136—230 |
| 3,347,712 | 10/1967 | Hawkins et al. _____ 136—230 |
| 3,351,498 | 11/1967 | Shinn et al. _____ 136—230 |

ALLEN B. CURTIS, Primary Examiner

C. F. LeFEVOUR, Assistant Examiner

U.S. Cl. X.R.

73—359